(12) United States Patent
Nelson et al.

(10) Patent No.: US 7,920,788 B2
(45) Date of Patent: Apr. 5, 2011

(54) OPTICAL TRANSCEIVER WITH CLOCK FOR PROVIDING MAINTENANCE AND LIFETIME INFORMATION

(75) Inventors: Stephen Nelson, Santa Clara, CA (US);
Kishore Kamath, San Jose, CA (US);
John Hsieh, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 589 days.

(21) Appl. No.: 11/738,986

(22) Filed: Apr. 23, 2007

(65) Prior Publication Data

US 2007/0196104 A1    Aug. 23, 2007

Related U.S. Application Data

(63) Continuation-in-part of application No. 11/324,982, filed on Jan. 3, 2006, now Pat. No. 7,835,642.

(60) Provisional application No. 60/641,117, filed on Jan. 3, 2005.

(51) Int. Cl.
*H04B 10/02* (2006.01)

(52) U.S. Cl. .............................. 398/23; 398/25; 398/135

(58) Field of Classification Search .................... 398/25, 398/135–136, 23
See application file for complete search history.

(56) References Cited

U.S. PATENT DOCUMENTS

| | | | |
|---|---|---|---|
| 5,646,954 A * | 7/1997 | Das et al. | 372/55 |
| 5,754,576 A | 5/1998 | Kusano et al. | |
| 5,812,572 A * | 9/1998 | King et al. | 372/38.04 |
| 6,005,695 A | 12/1999 | Roberts | |
| 6,142,378 A | 11/2000 | Katoh et al. | |
| 6,285,481 B1 | 9/2001 | Palmer | |
| 2003/0053170 A1 * | 3/2003 | Levinson et al. | 359/152 |
| 2005/0031357 A1 * | 2/2005 | Soto et al. | 398/198 |

FOREIGN PATENT DOCUMENTS

JP      2004-319657       11/2004

OTHER PUBLICATIONS

U.S. Appl. No. 11/324,982, Mail Date May 17, 2010, Office Action.
U.S. Appl. No. 11/324,982, Mail Date Jan. 11, 2010, Final Office Action.
U.S. Appl. No. 11/324,982, Mail Date Jul. 24, 2009, Office Action.
U.S. Appl. No. 11/324,982, Mail Date Dec. 18, 2008, Final Office Action.
U.S. Appl. No. 11/324,982, Mail Date Jul. 29, 2008, Office Action.

* cited by examiner

*Primary Examiner* — Leslie Pascal

(74) *Attorney, Agent, or Firm* — Maschoff Gilmore & Israelsen

(57) ABSTRACT

An optoelectronic device uses microcode to perform an end of life calculation for the optoelectronic device. In particular, the optoelectronic device senses environmental and operational parameters under changing conditions during device operation. The optoelectronic device then calculates the end of life for itself based on one or more of the sensed environmental and/or operational parameters. The calculation can be done in real time and using digital logic. The calculation can provide a result in a format which is useful to a host system with which the device is connected. The optoelectronic device may automatically shut itself down upon reaching its calculated end of life.

15 Claims, 4 Drawing Sheets

OPTICAL TRANSCEIVER WITH CLOCK FOR PROVIDING MAINTENANCE AND LIFETIME INFORMATION

CROSS-REFERENCE TO RELATED APPLICATIONS

This application is a continuation-in-part of U.S. patent application Ser. No. 11/324,982, filed Jan. 3, 2006 now U.S. Pat. No. 7,835,642, which claims the benefit of U.S. Provisional Patent Application No. 60/641,117, filed Jan. 3, 2005, and entitled "OPTICAL TRANSCEIVER MODULE END OF LIFE INDICATION." The foregoing patent applications are incorporated herein by reference.

BACKGROUND OF THE INVENTION

1. The Field of the Invention

The present invention relates generally to optoelectronic devices. More specifically, the present invention relates to optoelectronic devices that use microcode to perform end-of life and related calculations for themselves.

2. The Related Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

Typically, data transmission in such networks is implemented by way of an optical transmitter (also referred to as an "optoelectronic transducer"), such as a laser or Light Emitting Diode ("LED"). The optoelectronic transducer emits light when current is passed through it, the intensity of the emitted light being a function of the magnitude of the current. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g. referred to as a "laser driver" when used to drive a laser signal) configured to control the operation of the optical transmitter in response to various control inputs. The optical transceiver also generally includes an amplifier (e.g. often referred to as a "post-amplifier") configured to amplify the channel-attenuated received signal prior to further processing. A controller circuit (hereinafter referred to as the "controller") controls the operation of the laser driver and post-amplifier.

During operation of the transceiver, the laser is susceptible to aging and its life span can be affected by the operation and environment of the transceiver. Additionally, a host system or other user of the transceiver typically desires to know the remaining life span of the transceiver, which is usually based on the remaining life span of the laser. Conventionally, the "end of life" of the laser was estimated by providing the host system with "beginning of life" characteristics of the laser, which were determined and stored in the transceiver module at the time of manufacture. The host system would then be required to measure and/or calibrate certain parameters such as laser current, transmit power and receive power. The beginning of life data included a set point and coefficients for these parameters. Using analog parameter measurements and the beginning of life data, an end of life calculation could be performed. However, this method has various drawbacks. First, it requires the host system to exert a significant amount of effort to gather and process data. Second, in some cases, some host systems do not have the capacity to measure data, calibrate data, and/or perform this calculation. Third, this method focuses on the susceptibility of the laser to aging, even though other transceiver components could conceivably suffer performance degradation from aging as well.

Further, conventional methods do not provide for the most accurate estimation of end of life of a transceiver because they have not accounted for additional factors that affect the life span of the transceiver. However, these additional factors are not easily obtained by the user. In addition, the extent to which each parameter affects the end of life of the transceiver can change as the transceiver ages, according to the actual operation of the transceiver. Conventional methods of calculating the end of life of a transceiver are unable to account for these variations.

Thus, conventional systems and methods for estimating the end of life of a transceiver can require a significant amount of effort, thereby increasing the cost not only of the optical transceiver itself, but its operation as well. Therefore, what would be desired is an optical transceiver that provides an estimate of end of life of the transceiver without requiring excessive participation by the host system in which the transceiver is located.

BRIEF SUMMARY OF THE INVENTION

The foregoing problems with the prior state of the art are overcome by the principles of the present invention, which relate to systems and methods for more accurately estimating the end of life of an optoelectronic device and for providing the estimation of the end of life in a useful way to a host system or other user. The end of life of the optoelectronic device is determined by obtaining diagnostic data from the optoelectronic device. The diagnostic data can be provided in analog form and converted to digital form. In addition, the diagnostic data can be provided in true units without the need for conversion factors. The end of life calculation can take into consideration multiple environmental and operational factors. Further, the end of life calculation can be calculated in real time. Additionally, the end of life calculation can be provided to a customer in a format that is easily understandable and useful to the customer.

Exemplarily, among other things, an optoelectronic device has a persistent memory and a controller chip, the controller chip having at least one processor, a system memory, and a sensor for sensing an environmental parameter. The persistent memory includes microcode that when loaded into system memory and executed by the processor(s), causes the optoelectronic device to obtain diagnostic data such as environmental parameters and operating parameters. The optoelectronic device then proceeds to perform an end of life calculation for itself using the diagnostic data. Because the end of life calculation is a complex calculation based on a number of different environmental and operational parameters, the ability to obtain diagnostic data on all of these different environmental and operational parameters leads to a more accurate end of life calculation.

Thus, the end of life calculation is performed inside the optoelectronic device itself, rather than by the host system. Further, the calculation results can be provided to the host system in a useful format and on a real-time basis. This can reduce or eliminate the amount of effort required by the host system to calculate and estimate the end of life of the optoelectronic. Accordingly, the principles of the present invention highly automate the end of life calculation for the device while providing the calculation with a relatively higher degree of accuracy than what was previously possible. These features in turn reduce the overall cost of the optical transceiver.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is directed to systems and methods for providing accurate estimations of end of life calculation for optoelectronic devices. The end of life calculation is determined by accurately and in real time monitoring diagnostic data of the optoelectronic device. The end of life calculation can be provided to a host system or other user in a format that is readily usable without further manipulation by the host system.

As used herein, the term "manufacturer" will refer to an entity which produces the optoelectronic device while the term "customer" refers to an entity which generally purchases an optoelectronic device for use in a fiber optic network. Both manufacturers and customers can be considered "users." It is usually the case that the customer will desire to have an end of life calculation for the optoelectronic device. In this case, the end of life calculation can be made available to the user's host system with which the optoelectronic device is connected. However, there may be some instances in which the manufacturer could also desire an end of life calculation for an optoelectronic device. Generally, however, the present invention provides a way for the manufacturer to easily provide a customer or other user with an accurate end of life calculation with minimal effort on the part of the manufacturer, customer or other user.

Figure 1:
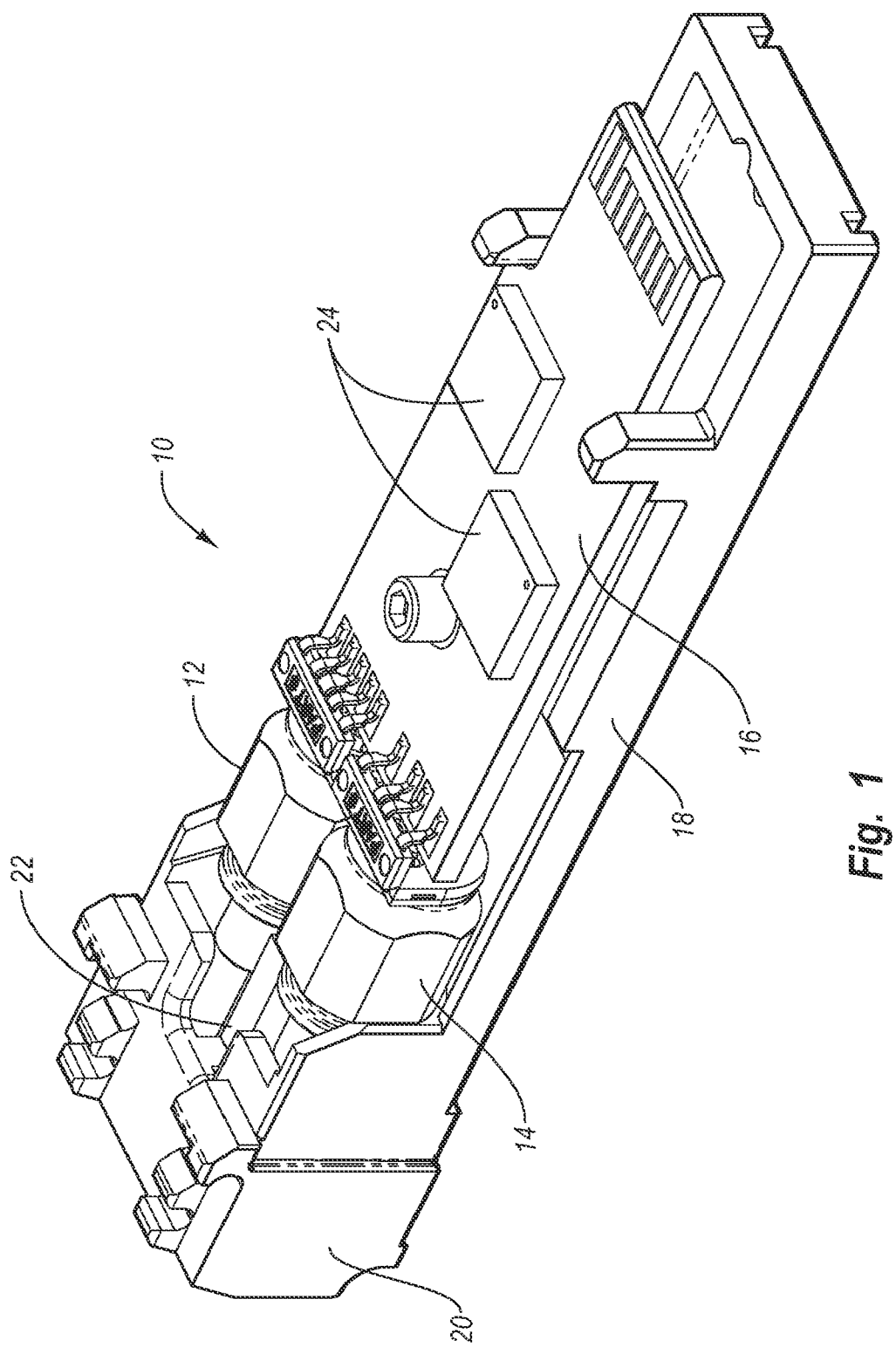
FIG. 1 is a perspective view of one embodiment of an optical transceiver according to one embodiment of the present invention.

The present invention can be implemented in various optoelectronic devices. As used herein, the term "optoelectronic device" includes devices having both optical and electrical components. Examples of optoelectronic devices include, but are not limited to optical transceiver modules ("optical transceivers"), transmitters, and/or receivers. FIG. 1 illustrates an exemplary optical transceiver 10 in which the principles of the present invention may be employed. The principles of the present invention allow for the optical transceiver 10 to perform end of life calculations autonomously and in real time. While the optical transceiver 10 will be described in some detail, the optical transceiver 10 is described by way of illustration only, and not by way of restricting the scope of the invention.

As depicted in FIG. 1, an exemplary transceiver module 10 includes a transmitter optical subassembly ("TOSA") 12, a receiver optical subassembly ("ROSA") 14, a printed circuit board (PCB) 16 and a housing 18 for containing the components of module 10. TOSA 12 and ROSA 14 are configured to be electrically and/or mechanically connected to PCB 16. In one embodiment, TOSA 12 and ROSA 14 are connected to PCB 16 using a lead frame connector disclosed in U.S. patent application Ser. No. 10/809,992, filed Mar. 26, 2004, which is herein incorporated by reference. Of course other structures may be used to connect TOSA 12 and ROSA 14 to PCB 16 such as, but not limited to, flexible circuits, through-hole connections, and surface-mount connections. The transceiver 10 also includes a housing end 20, and LC cable receptacles 22 for receiving and securely connecting LC cables to TOSA 12 and ROSA 14.

The optoelectronic devices can be constructed, for example, to be compatible with the XFP MSA standards, including those set forth in the 10 Gigabit Small Form Factor Pluggable Module adoption draft specification Revision 2.0 published by the XFP Multi Source Agreement (MSA) Group on Dec. 16, 2002 (www.xfpmsa.org), which is incorporated herein by reference, and with future revisions or final XFP MSA specifications that will be adopted in the future. Furthermore, the principles of the present invention may be implemented in optoelectronic devices of any form factor such as XFP, SFP and SFF, without restriction. It will be appreciated, however, that the optoelectronic devices need not comply with standardized form factor requirements and may have any size or configuration necessary according to a particular design. The principles of the present invention are suitable for 1 G, 2 G, 4 G, 10 G and higher bandwidth fiber channels.

TOSA 12 includes a light source (not shown) having any suitable configuration including, but not limited to, a distributed feedback ("DFB") laser, a VCSEL, a cooled or uncooled EML, an EML with a wavelocker, a Fabry-Perot laser, a laser emitting diode ("LED"), and the like. ROSA 14 may comprise, for example, a photodiode, an avalanche photodiode (APD), positive-intrinsic-negative photo diodes (PIN), and the like. In one embodiment, module 10 may include a temperature-compensated externally modulated laser (EML) for use in dense wavelength division multiplexing applications (DWDM) and therefore be more completely described as a DWDM EML XFP transceiver module.

As illustrated in FIG. 1, PCB 16 includes circuitry and electronic components 24 for use with the TOSA 12 and ROSA 14 in performing the optical signal transmission and reception activities of the transceiver 10. Among the components 24 are a laser driver, a post amplifier, a controller chip, and persistent memory. These components are described more fully below. It will be appreciated that one or more of these components can be integrated on a single chip, or can be separately disposed on the PCB 16. In one exemplary embodiment, the transceiver 10 uses the controller chip to drive end of life calculations of the transceiver internally within the module. In particular, the controller chip cooperates in one embodiment with the laser driver, post amplifier, and other components within the transceiver 10 to obtain diagnostic data and to perform an end of life calculation of the transceiver, which can then be exported from the module, such as to a host system.

Figure 2:
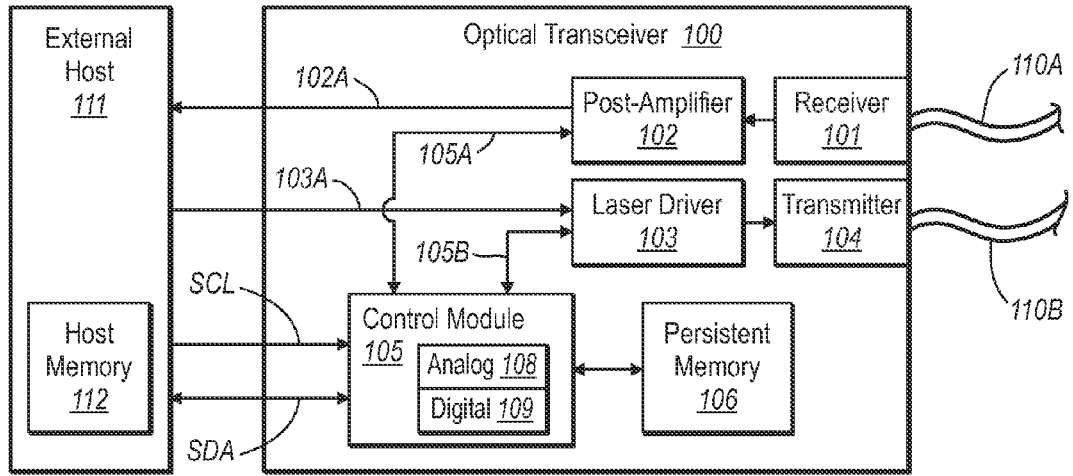
FIG. 2 schematically illustrates an exemplary optical transceiver that may implement features of the present invention.

With reference now to FIG. 2, the circuitry of an exemplary optoelectronic device, implemented here as a transceiver 100 is further illustrated, showing the interaction between the device 100, a host system such as an external host 111, and fiber optic cables 110A, 110B. Note that the transceiver 100 shown in FIG. 2 is a simplified block diagram of a transceiver such as that shown at 10 in FIG. 1.

In operation, the optical transceiver 100 receives an optical signal from fiber 110A using an optical receiver 101, which corresponds to the ROSA 14 of FIG. 1. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to the host 111 as represented by arrow 102A. The host 111 may be any computing system capable of communicating with the optical transceiver 100. The host 111 may contain a host memory 112 that may be a volatile or non-volatile memory source. In one embodiment, the optical transceiver 100 may be integrated with the host 111 in the form of a printed circuit board or other components/chips within the host 111, although this is not required. Additionally, some components of the optical transceiver 100 can reside on the host 111 while the other components of the transceiver reside on a printed circuit board separate from the host.

The optical transceiver 100 may also receive electrical signals from the host 111 for transmission onto the fiber 110B. Specifically, the laser driver 103 receives the electrical signal as represented by the arrow 103A, and drives an optical transmitter 104, which corresponds to the TOSA 12 of FIG. 1. As described, the transmitter 104 includes a suitable light source, such as a laser or light emitting diode ("LED") that is driven by the electrical signals provided by the host 111, thereby causing the light source to emit onto the fiber 110B optical signals representative of the information carried in the electrical signal. Accordingly, the optical transmitter 104 serves as an electro-optic transducer.

The behavior of the optical receiver 101, the post-amplifier 102, the laser driver 103, and the optical transmitter 104 may vary dynamically due to a number of factors. For example, temperature changes, power fluctuations, and feedback conditions may each affect the performance of these components. Accordingly, the transceiver 100 includes a control module 105, which may evaluate environmental conditions, such as temperature, and/or operating conditions, such as voltage, and receive information from the post-amplifier 102 (as represented by arrow 105A) and from the laser driver 103 (as represented by arrow 105B). This allows the control module 105 to optimize the dynamically varying performance, and additionally detect when there is a loss of signal. Specifically, the control module 105 may optimize the operation of the transceiver 100 by adjusting settings on the post-amplifier 102 and/or the laser driver 103 as represented by the arrows 105A and 105B. These settings adjustments can be intermittent and are generally only made when temperature or voltage or other low frequency changes so warrant. As discussed, the control module 105, the post-amplifier 102, and the laser driver 103 may be the same chip. Alternatively, they may be distributed across two or more chips.

The control module 105 may have access to a persistent memory 106, which in one embodiment, is an Electrically Erasable and Programmable Read Only Memory (EEPROM). Persistent memory 106 may also be any other non-volatile memory source. The persistent memory 106 and the control module 105 may be packaged together in the same package or in different packages without restriction.

Data and clock signals may be provided from the host 111 to the control module 105 using the serial clock line SCL, and the serial data line SDA. Also data may be provided from the control module 105 to the host 111 using serial data signal SDA to allow for transmitting diagnostic data such as environmental and/or operational parameters. The control module 105 includes both an analog portion 108 and a digital portion 109. Together, they allow the control module to implement logic digitally, while still largely interfacing with the rest of the optical transceiver 100 using analog signals.

The control module 105 senses and retrieves diagnostic data relating to the operation of the transceiver 100. As used herein, the term "diagnostic data" will refer to both environmental parameters and operational parameters, whether the parameter is provided as raw data or processed data. Diagnostic data can be provided in analog or digital form. The environmental parameters may be, for example, ambient transceiver temperature, supply voltage, humidity, acceleration, ambient light levels, ambient vibration, magnetic flux intensity, or any other environmental parameter that may affect the performance of an optoelectronic device and/or that may be compensated for by suitable adjustment of one or more operational parameters. Generally, environmental parameters are not directly controlled by the transceiver but nonetheless affect its operation.

Operational parameters can include statistical information such as, for example, total operational time, average operational time between boots, total number of error conditions encountered, identification of one or more error conditions encountered, categorization of the number of error conditions encountered for a plurality of different error types, number of times the optical transceiver has been booted, or the like. Operational parameters also include, for example, laser wavelength, laser temperature, laser bias current, a Thermo Electric Cooler (TEC) current, transmit power, receive power, acceleration, peak acceleration, and—the like. Generally, operational parameters are considered those parameters over which direct control can be had by the transceiver or host.

Figure 3:
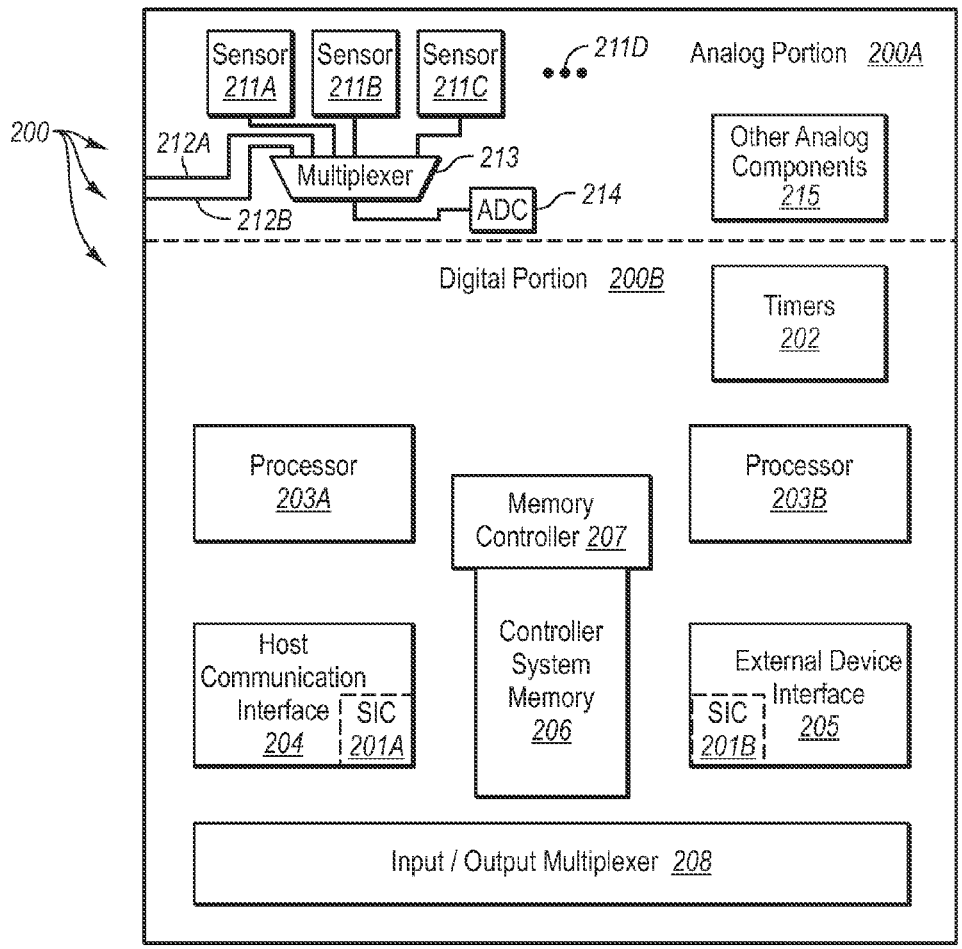
FIG. 3 schematically illustrates an example of a control module used in the transceiver of FIG. 2.

FIG. 3 schematically illustrates an exemplary configuration 200 of the control module 105 in further detail. The control module 200 includes an analog portion 200A that represents an example of the analog portion 108 of FIG. 2, and a digital portion 200B that represents an example of the digital portion 109 of FIG. 2. For example, the analog portion 200A may contain digital to analog converters, and analog to digital converters, high speed comparators (e.g., for event detection), voltage based reset generators, voltage regulators, voltage references, clock generator, and other analog components. For example, the analog portion includes sensors 211A, 211B, 211C amongst potentially others as represented by the horizontal ellipses 211D. Each of these sensors may be responsible for measuring diagnostic data including environmental and/or operational parameters that may be measured from the control module 200 such as, for example, supply voltage and transceiver temperature. The control module may also receive external analog or digital signals from other components within the optical transceiver. Two external lines 212A and 212B are illustrated for receiving such external analog signals although there may be many of such lines.

The internal sensors 211A through 211D may generate analog signals that represent the measured values. In addition, the externally provided signals 212A, 212B may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow for any order of analog signals to be sampled by ADC 214.

As previously mentioned, the analog portion 200A can include high speed comparators that may be supplied with one input being from an internal sensor or from an external line to receive a measured parameter value. The other input to the comparator may be a comparison value. Should the measured parameter value exceed the comparison value, the comparator may generate a logical high (or low) which indicates that the event has occurred. For example, suppose that the standard maximum transceiver temperature is 85 degrees Celsius. The actual measured transceiver temperature may be provided as one input to a comparator, while a value representing 85 degrees Celsius is provided to the other input of the comparator.

The digital portion 200B of the control module 200 may include a timer module 202 that provides various timing signals used by the digital portion 200B. Such timing signals may include, for example, programmable processor times. The timer module 202 may also act as a watchdog timer or generate a clock signal whenever the transceiver is in operation. In the latter case, the clock signal can be used to increment the total operational time statistical parameter. Operational time may refer to the time that power is supplied to the transceiver, the time that the laser is lasing, or any combination thereof.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 using the serial data (SDA) and serial clock (line SCL) lines and the serial data line SDA of the optical transceiver 100. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory.

While system memory 206 may be RAM, it may also be a processor, register, flip-flop or other memory device. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as $I^2C$ or may be another serial interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

In accordance with the present invention, the optical transceiver 100 performs an end of life calculation that can then be exported to the customer at host 111. This may be accomplished in a number of ways using the environment described and illustrated with respect to FIGS. 2 and 3. It will be understood that this specific environment is only one of countless architectures in which the principles of the present invention may be employed. As previously stated, the principles of the present invention are not intended to be limited to any particular environment.

Figure 4:
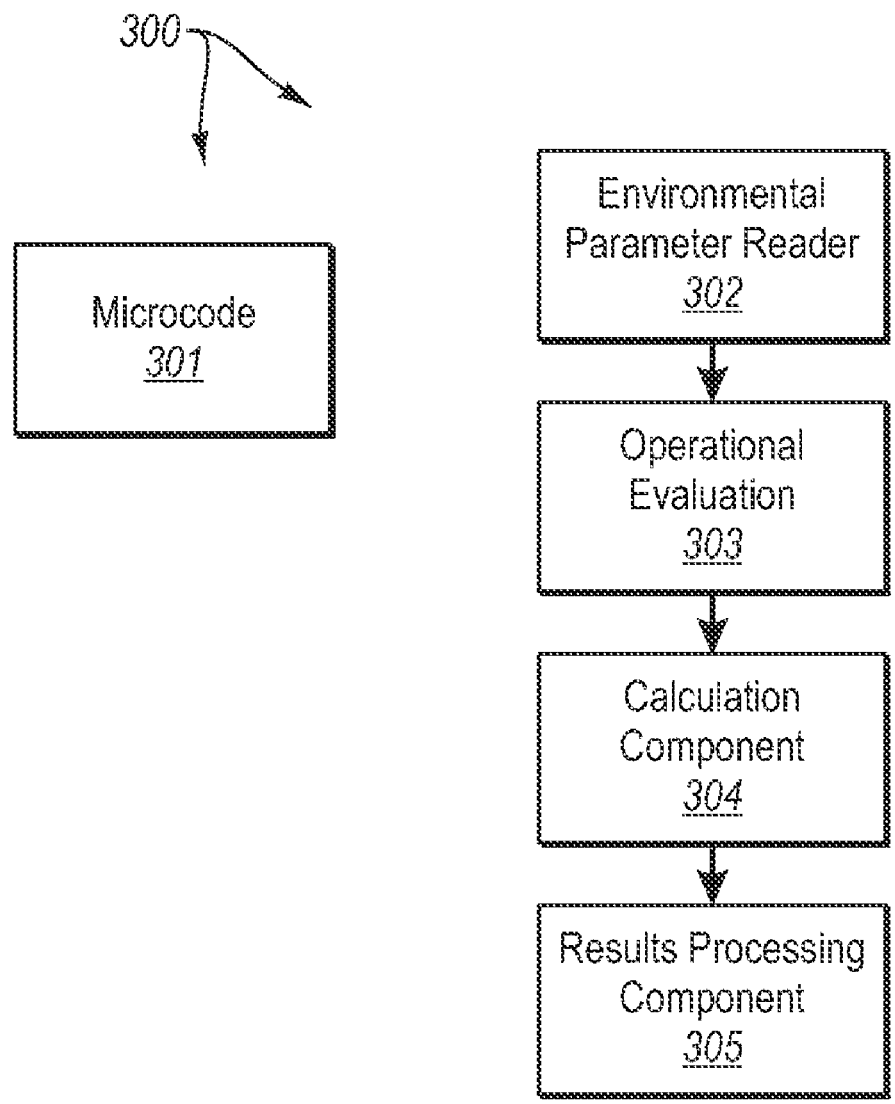
FIG. 4 illustrates an exemplary software architecture that may be maintained in system memory in accordance with the principles of the present invention.

With continuing reference to FIGS. 2 and 3, reference is now made to FIG. 4, which illustrates a software architecture 300 that may be instantiated in system memory 206. In particular, the processors 203 load microcode 301 into the system memory 206 from the persistent memory 106. The remainder of the software architecture 300 is either instantiated in system memory 206 upon the execution of the microcode 301, or else abstractly represents functionality implemented by the optical transceiver 100 upon the execution of the microcode 301. Alternatively, the microcode 301 may be directly executed from persistent memory. In that case, the microcode 301 is loaded into the system memory a fraction at a time (e.g., one instruction at a time) for execution by the processor. In this latter case, the system memory may be a register, flip-flops, or any other memory regardless of size or type.

Figure 5:
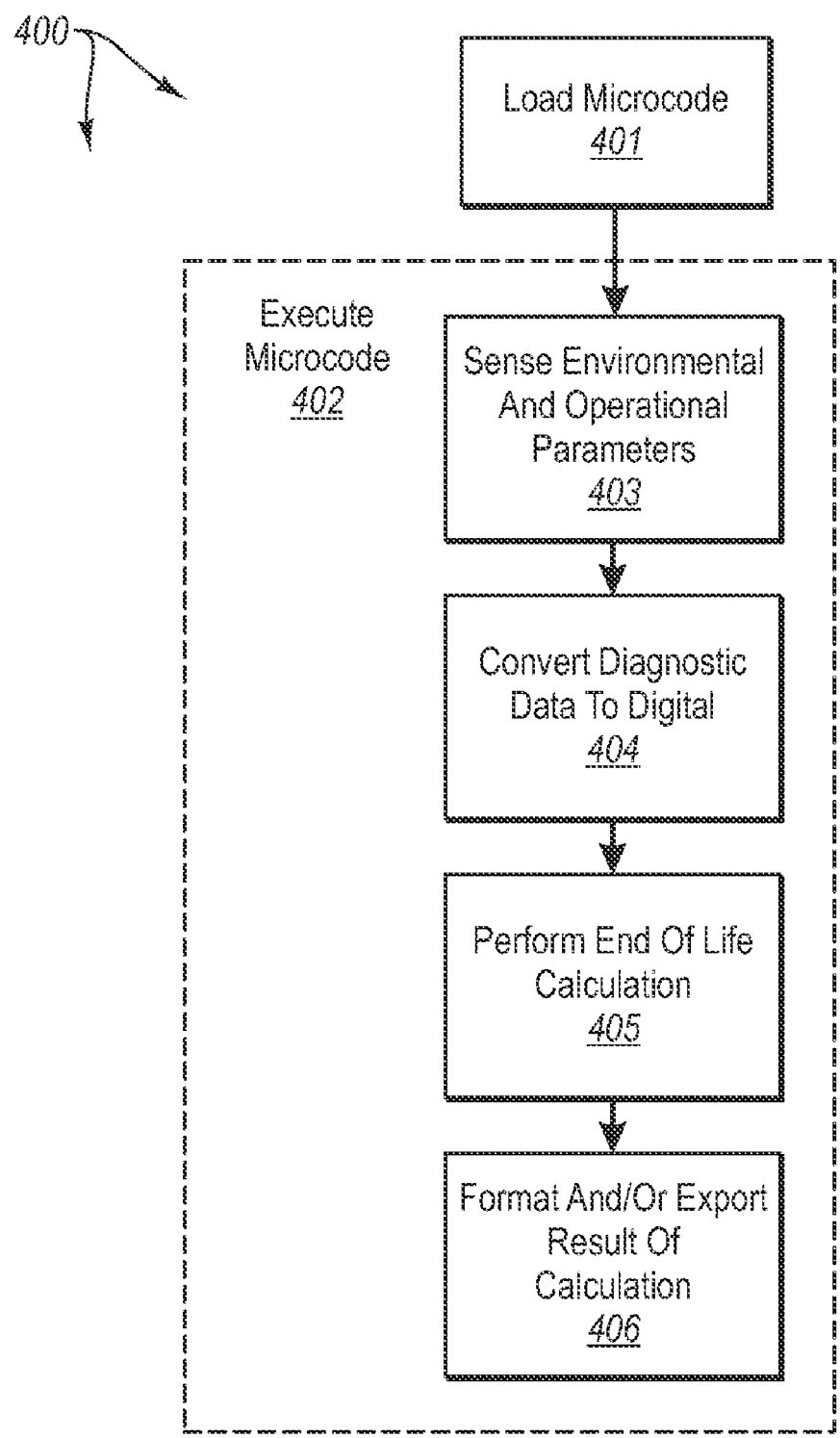
FIG. 5 illustrates a method for performing an end of life calculation for a laser in accordance with one embodiment of the present invention.

The software architecture 300 includes an environmental parameter reader component 302, an operation evaluation component 303, a calculation component 304, and a results processing component 305. The software architecture 300 of FIG. 4 will be described with reference to FIG. 5, which illustrates a flowchart of an exemplary method 400 for the optical transceiver to perform an end of life calculation.

First, the optical transceiver 100 loads the microcode 301 from persistent memory 106 to system memory 206 (stage 401). One or more of the processors 203 then execute the microcode (stage 402). The microcode 301 is structured such that the optical transceiver 100 performs the acts illustrated at stage 402 when executed. Specifically, the processors 203 sense current diagnostic data for the optoelectronic device (stage 403), the diagnostic data is converted as needed to digital form (stage 404), an end of life calculation for the device is performed (stage 405), and the results of the calculation can be formatted and/or exported to, for example, the host 111 (stage 406).

In further detail, at stage 401, the microcode for performing an end of life calculation is loaded. Exemplarily, one or more of the processors 203 load microcode stored in persistent memory 106 into controller system memory 206. If the persistent memory 106 is an I$^2$C EEPROM, then this may be accomplished using the conventional I$^2$C two-wire interface. However, for other persistent memories, other communication protocols may be used. The microcode from persistent memory 106 includes functions that direct the end of life calculation.

Alternatively, the microcode may be provided by the external host 111, delivered to control module 105 over serial data line SDA. For example, external host memory 112 may contain a library of different microcode functions. A user is thus able to interface with host 111 and select the microcode relating to the end of life calculation. In addition, external host 111 may be connected to the Internet or some other wide area network, allowing processors 203 to acquire microcode from a remote source. This connection can be achieved by any standard Internet or wide area network protocol. It will be appreciated that additional microcode may exist or be provided from a source to the control module 105 for performing functions that are related, unrelated, or preparatory to performing an end of life calculation. Thus, the end of life calculation can be initiated by the manufacturer or customer in several ways.

The end of life calculation of the transceiver is based on a number of different parameters that can be measured and obtained by control module 105. At stage 403, the microcode can drive retrieval of diagnostic data measurements. For instance, the environmental parameter reader component 302 (FIG. 4) can cause environmental parameters, such as ambient transceiver temperature, to be sensed and then made accessible to the rest of the functional components in the software architecture 300. Operational parameters of the transceiver 100 can be similarly obtained using the operation evaluation component 303. For instance, the operation evaluation component 303 can monitor transmit power, wavelength and the bias current for the laser included in the optical transmitter 104, as well as operational parameters for other components of the transceiver.

The calculation component 304 then performs the calculation using the desired environmental or operational parameters as provided by the environmental parameter reader component 302 and/or operation evaluation component 303. The calculation component 304 can take into account baseline parameters. As such, persistent memory 106 or controller system memory 206 may include baseline measurements of parameters that influence the end of life calculation which the calculation component 304 can reference. Other baseline parameters which the calculation component may reference include manufacturer-designated operating life values. Often, operating life values depend on environmental and operational conditions or parameters during the life of the transceiver and are based on the mean time between failure (MTBF), failures in time (FIT) or other reliability parameters (collectively "reliability values") for the transceiver. Typically, the reliability values are derived through life cycle testing under accelerated conditions during the final steps of product development and they may represent reliability data from all the transceiver components in aggregate, rather than just from one component such as the laser. These operating life values may also be included in the persistent memory 106 or controller system memory 206.

The complexity of the end of life calculation depends on how many parameters are taken into account. Generally, the more parameters that are involved, the more accurate will be the result of the end of life calculation. Conventionally, it was very difficult to measure and calibrate parameters, and the customer was generally required to do this. However, in the present invention, the optoelectronic device itself measures and obtains an increased number of diagnostic data than was heretofore possible. As such, it is possible to obtain and consider additional parameters that affect the end of life calculation that were not able to be considered before.

Because control module 105 has access to a large number of environmental and operational parameters that have not conventionally been measurable by the customer, the end of life calculation can consider more of these parameters. Typically, the end of life calculation requires at least a measurement of laser current, transmit power and laser wavelength. However, as discussed above, other environmental and operational parameters can be taken into account for calculating the end of life estimation such as, but not limited to, voltage, temperature, TEC settings, etc.

The calculation component 304 then performs the end of life calculation based on the identified diagnostic data. At stage 404, the end of life calculation can be facilitated by analog portion 200A and digital portion 200B cooperating to provide the diagnostic data in digital form. As discussed above, analog measurements can be converted to digital measurements to facilitate compatibility with a digital circuit. Thus, calculation of the end of life of the transceiver can be done using digital logic, increasing the speed and accuracy of the calculation. In addition, because the diagnostic data can be provided in true units within control module 105, no conversion factors are required, which further increases the accuracy and speed of the end of life calculation.

At stage 405, the control module 105 drives the end of life calculation which provides a numeric result. At stage 406, the numeric result can be exported externally of the optoelectronic device 100 to, for example, host 111. Providing a numeric result can include the results processing component 305 formatting the result in a manner which is easily understood by the user. For example, the format can be the percentage of the amount of life used or remaining, or as an estimate of the amount of time left (e.g., 10,000 hours). The result can be provided in graphical form to easily assist the user in visualizing the amount of life left in the optoelectronic device. It will be appreciated that this format is more easily understood than raw data measurements which conventionally had to be calibrated and/or converted to a more manageable number. In addition, the end of life calculation provided by the control module can be accompanied by a confidence value that provides some measure as to the accuracy of the calculation, e.g., 10,000 hours of transceiver life left, wherein this value is made with a 90% confidence level.

The end of life calculation results can be made available to the user and/or host 111 in various ways. As described above, the results can be exported to the host 111. In another embodiment, however, the results can be simply maintained in the system memory 206 of the control module 200 for accessing by the host. In yet another embodiment, the results can be maintained in the persistent memory 106 of the transceiver 100 for forwarding or accessing at a later time. These and other manners of storing and/or accessing the calculation results are therefore understood to fall within the principles of the present invention.

Though the discussion above has focused on the use of current parameter measurements in determining end of transceiver life, in one embodiment of the present invention both current and historical parameter data can be used together in determining end of transceiver life. In this way, more accurate transceiver life estimates can be made by considering not only current transceiver conditions but also the history of the transceiver and the environment in which it has been operated over time.

Examples of historical parameter data that can be acquired include environmental parameters such as total operating time, ambient transceiver temperature and supply voltage, and how long the transceiver has operated under such conditions. Data regarding when the transceiver was transferred to a new environment under different environmental parameters can also be taken. These are only examples of the type of data that can be sensed; a variety of environmental and operating parameters can be sensed and stored for use in calculating end of transceiver life and other determinations in the transceiver according to embodiments of the present invention.

Such data can be organized in storage in a manner that best suits its later use in determining end of transceiver life and other calculations. In one embodiment, for instance, the data can be grouped in "bins" that group like data together. As an example, the possible ambient temperatures in which the transceiver can operate can be divided into three bins: 20-40 degrees Celsius, 41-60 degrees, and 61-80 degrees. These data can then be accessed and used by the control module in determining what percent of transceiver life has been expended at each of the three temperature ranges. This in turn enables a more accurate estimation of the time of transceiver life that is left, as the ambient temperature about the transceiver can affect the operational lifetime thereof Similar bins or other categorizations can be defined for other parameters mentioned herein, such as laser power, bias current, wavelength, etc.

The historical parameter data in one embodiment is stored digitally in the persistent memory 106 of the transceiver 100, or other suitable location within or without the transceiver. The historical parameter data can be updated as new end of life parameter measurements are periodically made, thereby providing a running statistical record of historical transceiver operation.

For example, in one embodiment, the end of life calculation using current and historical data can proceed as follows: during transceiver operation, the microcode 301 can be loaded (stage 401) into the system memory 206 and executed by one or more of the processors 203 (stage 402) as generally described above. Analog measurements made by the appropriate sensors located in the transceiver 100 can be forwarded from the sensors to the analog portion 200A of the control module 200 (stage 403). In the present example, operational parameter measurements concerning laser power, laser bias current, and laser emitted wavelength are sensed and forwarded.

As explained, the analog parameter measurements are converted into digital data by the ADC 214 of the control module analog portion 200A, or by another suitable component (stage 404).

Stage 405 is then executed, wherein an estimation of the end of life for the transceiver is calculated. In accordance with the above discussion, this calculation can be made using only the currently gathered parameter measurements, or using both current and historical measurements. In the latter case, once the current parameter measurements have been converted into digital data by the ADC 214, they are input into the system memory 206. Similarly, the pertinent historical parameter measurement data is called up by the processors 203 from the persistent memory 106 and input into the system memory 206 as well. In the present example, both current and historical parameter data regarding laser power, laser bias current, and laser emitted wavelength are input into the system memory 206.

Using the parameter measurements present in the system memory 206, one or both processors 203 calculate the estimated end of life of the transceiver according to loaded microcode configured to make such a calculation. In one embodiment, the microcode making this calculation can be configured to use the parameter measurements to determine change in laser slope efficiency over time, e.g. from beginning of laser life to the present time, the rate of change of the laser slope efficiency over time, and any acceleration in the rate of slope laser efficiency change over time. Once calculated, the estimated end of transceiver life, possibly with an included confidence level, can be stored or provided to the host as discussed above.

Once the end of life has been calculated, it, together with the current parameter measurements, can be forwarded to the persistent memory 106 to be stored as part of the historical data set maintained therein. In this way, transceiver performance over its operational lifetime can be tracked so as to provide accurate end of life calculations.

In another embodiment using current and historical parameter data, the end of life calculation can proceed in the following manner: during transceiver operation, the microcode 301 can be loaded (stage 401) into the system memory 206 and executed by one or more of the processors 203 (stage 402) as generally described above. Analog measurements made by the appropriate sensors located in the transceiver 100 can be forwarded from the sensors to the analog portion 200A of the control module 200 (stage 403). In the present example, parameter measurements concerning temperature, such as ambient transceiver temperature, transceiver component temperature, or both are sensed and forwarded.

As explained, the analog parameter measurements are converted into digital data by the ADC 214 of the control module analog portion 200A, or by another suitable component (stage 404).

Stage 405 is then executed, wherein an estimation of the end of life for the transceiver or transceiver component is calculated. In accordance with the above discussion, this calculation can be made using only the currently gathered parameter measurements, or using both current and historical measurements. In the latter case, once the current parameter measurements have been converted into digital data by the ADC 214, they are input into the system memory 206. Similarly, the pertinent historical parameter measurement data is called up by the processors 203 from the persistent memory 106 and input into the system memory 206 as well. In the present example, both current and historical parameter data regarding temperature are input into the system memory 206. Historical temperature data may include the total time that the transceiver or transceiver component has operated within the operating temperature ranges defined by the temperature bins discussed above. The processors 203 may also call up manufacturer-designated operating life values associated with the different operating temperature ranges from the persistent memory 106 and input them into the system memory 206.

Using the parameter measurements and operating life values present in the system memory 206, one or both processors 203 calculate the estimated end of life of the laser according to loaded microcode configured to make such a calculation. In one embodiment, the microcode making this calculation can be configured to use the operating life values and the current and historical parameters to determine what percentage of the transceiver's life has been expended at each of the temperature ranges and the amount of time until the end of life of the transceiver at the current temperature. In one aspect of this embodiment, the percentage of life already expended has previously been calculated and stored and the processors call it up, along with the current operating temperature and the operating life value for the transceiver operating at the current operating temperature. It is then a simple matter to calculate the end of life for the transceiver.

For instance, suppose that three manufacturer-designated operating life values are 20,000 hours if operated between 20 and 40 degrees Celsius, 8,000 hours if operated between 41 and 60 degrees and 4,000 hours if operated between 61 and 80 degrees. Further suppose that the transceiver is operated between 20 and 40 degrees during a first period for 10,000 hours, between 41 and 60 degrees during a second period for 2,000 hours, and then the temperature is increased to between 61 and 80 degrees and a user wants to know the estimated end of life of the transceiver operating at the increased temperature. During the first period, the transceiver expended 50% of its operating life. During the second period, the transceiver expended 25% of its operating life. The transceiver therefore has expended 75% of its operating life and has 25% remaining. Operating at the increased temperature, the estimated end of life of the transceiver is in 1,000 hours.

Once calculated, the estimated end of life, possibly with an included confidence level, can be stored or provided to the host as discussed above. The end of life calculation, together with the current parameter measurements, can be forwarded to the persistent memory 106 to be stored as part of the historical data set maintained therein. In a typical embodiment, the estimated end of life is continuously re-calculated and exported to the host while the transceiver is operated. This provides the host with a countdown timer for the life of the transceiver.

It should be noted here that the use of historical data in determining end of transceiver or transceiver component life and other related calculations has not previously been possible, especially by host systems that employ optical transceivers with pluggable form factors, such as XFP and SFP. Because they are now available via embodiments of the present invention, such historical data can be accessed from memory onboard the transceiver whenever the transceiver is plugged into a host, thereby enabling calculations with relatively greater accuracy to be made.

Using embodiments of the invention, users are able to replace transceivers during routine preventive maintenance rather than after transceiver failure, which may occur during a critical time. For instance, if a routine preventive maintenance cycle is 6 months and a transceiver is reporting an estimated end of life in less than 6 months, then the transceiver would be replaced. If the transceiver is reporting an estimated end of life in more than 6 months, the user could wait until the next preventive maintenance cycle to replace the part, and if needed order the replacement unit in advance.

In some embodiments, the invention facilitates automatic shutdown of the transceiver upon reaching the end of the manufacturer-designated operating life. In this case, the transceiver performs end of life calculations during the life of the transceiver, essentially counting down the amount of remaining life in the transceiver as compared to the manufacturer-designated operating life. Once the amount of remaining life reaches zero, microcode may instruct the transceiver to shut itself down. This could be an optional feature that some customers, such as Value Added Resellers (VARs), choose to enable. For instance, the transceiver manufacturer may sell transceivers to middlemen or VARs. The VARs integrate the transceivers into larger units, such as computers, which may ultimately be sold to end users. The VARs may enable the automatic shutdown feature of the transceivers per their business model or simply to enforce quality in the systems they sell to their customers.

Thus, in one aspect of the invention, systems and methods are provided for a more robust and accurate calculation of the end of life of an optoelectronic device or component thereof. That is, the end of life calculation is able to take into account more environmental and operating parameters that affect the end of life of an optoelectronic device than conventional methods. In addition, the customer has generally been limited to using those parameters that are reasonably measurable and/or reasonably able to be calibrated by the customer, such as laser current, transmit power, and receive power.

Another aspect of the invention provides an end of life calculation result with minimal or no effort required on the part of the user. Conventional end of life calculations have been done by the customer which, at times, required extensive effort on the part of the user. In contrast, the end of life calculation is autonomously driven by the control module 105 inside the optoelectronic device itself. In addition, the control module 105 obtains the information necessary in order to perform the calculation. Thus, little or no customer/host involvement is required to perform an end of life calculation. This eliminates the need for the customer to supply a host system which is able to read the digital diagnostics and perform the end of life calculation.

Further, converting the measurements of operational and environmental parameters to digital format as described above allows the control module 105 to use digital logic to perform the calculation. Conventionally, the user obtained analog measurements external to the optoelectronic device. Not only did this require more effort, but it contemplated a relatively more complex process involving more components than what is required by virtue of embodiments of the present invention. This equates to greater simplicity and accuracy for the end of life calculation.

In another aspect of the invention, the end of life calculation can occur on a real time basis. In real time, the environmental parameters and operational parameters are constantly fluctuating. In addition, the user may be constantly trying to calibrate the optoelectronic device to operate within calibrated parameters. In one embodiment, the optoelectronic device is able to do internal self-calibration. This is described in more detail in U.S. patent application Ser. No. 10/882,447, filed Jun. 30, 2004, which is herein incorporated by reference. Using self-calibration, the optoelectronic device is constantly readjusting and correcting for changes in environmental parameters and operational parameters. As such, the diagnostic data of the optoelectronic device will be constantly fluctuating. Conventional end of life calculations do not adequately take into account this constant fluctuation in parameters to the extent necessary to provide an accurate end of life estimation. Because the optoelectronic device can obtain a real-time analysis of the diagnostic data, the end of life calculation can constantly be updated and revised. This provides for a more accurate and, optionally, a continuous estimation of the end of life of an optoelectronic device. Further, once the end of life estimation reaches zero, the optoelectronic device may be configured to shut itself down.

This process of calculating the end of life of a transceiver may be repeated as needed or desired. For instance, the microcode may be structured so that this process is repeated each time the environmental parameter reader component 302 or operation evaluation component 303 detects a significant change in environmental or operational parameters that relate to the end of life of the transceiver. The result is continuous and accurate end of life calculation for the transceiver. In other embodiments, end of life calculation can be performed continuously, periodically according to a set schedule, or when instructed by the host.

It is appreciated that, in yet other embodiments, the historical parameter measurements can be sensed for purposes other than determining end of life for the transceiver. For instance, in one embodiment, ambient temperature parameter measurements may be made and stored in order to provide a histogram to the host regarding what percent of time the transceiver has operated under various temperature ranges. As an example, such data could be used to report to the host that the transceiver has operated for 60% of its life at an ambient temperature of 40 degrees Celsius. This information can be compiled in a format suitable for the host, then stored by the transceiver until accessed by the host, or forwarded to the host periodically. This in turn can enable the host to determine what, if any, modifications are necessary to optimize transceiver performance. Note that various different types of parameters could be measured and reported under this embodiment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optoelectronic device, a method for providing to a host system information relating to operation of the optoelectronic device, the method comprising:
   at a first time, sensing a first set of data relating to an optical data transmitting or receiving operation of an optoelectronic device in a fiber optic network;
   storing the first set of data sensed at the first time;
   calculating an estimated amount of time remaining before the optoelectronic device will reach an end of life state based on the stored first set of data;
   at a second time sensing a second set of data relating to an optical data transmitting or receiving operation of the optoelectronic device in the fiber optic network;
   storing the second set of data sensed at the second time;
   recalculating the estimated amount of time remaining before the optoelectronic device will reach an end of life state based on the stored second set of data.

2. The method for providing data as defined in claim 1, wherein the method is governed by a processor executing microcode.

3. The method for providing data as defined in claim 2, further comprising the optoelectronic device automatically shutting down upon reaching its calculated end of life.

4. The method for providing data as defined in claim 1, further comprising forwarding the estimated amount of time remaining before the optoelectronic device will reach an end of life state to the host system.

5. The method for providing data as defined in claim 1, wherein storing at least one of the first and second sets of data further includes:
   storing at least one of the first and second sets of data as a historical data set extending over at least a portion of the life of the optoelectronic device.

6. The method for providing data as defined in claim 1, wherein the optoelectronic device is an optical transceiver module having a laser diode light source.

7. The method for providing data as defined in claim 6, wherein the data relating to an optical data transmitting or receiving operation represents at least one parameter selected from the group consisting of laser bias current, laser power, laser wavelength, ambient temperature, laser temperature, and total operational time of the laser.

8. The method for providing data as defined in claim 1, wherein recalculating the estimated amount of time remaining before the optoelectronic device will reach an end of life state is performed in real time so as to account for recent changes in conditions of the optoelectronic device.

9. An optoelectronic device, comprising:
   at least one sensor for sensing a parameter relating to an optical data transmitting or receiving operation of the optoelectronic device in a fiber optic network; and
   a processor capable of executing microcode, wherein the microcode, when executed, causes the optoelectronic device to perform the following:
     at a first time, sensing a first set of parameter data using the at least one sensor;
     with the first set of parameter data, calculating an estimated future end of life of the optoelectronic device;
     at a second time, sensing a second set of parameter data using the at least one sensor; and
     with the second set of parameter data, recalculating the estimated future end of life of the optoelectronic device.

10. The optoelectronic device as defined in claim 9, wherein the microcode, when executed by the processor, further causes the optoelectronic device to perform the following:
    storing the estimated time of end of life in a memory location.

11. The optoelectronic device as defined in claim 9, wherein the microcode, when executed by the processor, further causes the optoelectronic device to perform the following:
    forwarding the estimated time of end of life to a host with which the optoelectronic device is connected.

12. The optoelectronic device as defined in claim 9, wherein the parameter is selected from environmental parameters and operational parameters relating to operation of the optoelectronic device.

13. The optoelectronic device as defined in claim 9, wherein the estimated future end of life of the optoelectronic device is calculated and recalculated based on an operating life value that corresponds to a specific operating parameter range.

14. The optoelectronic device as defined in claim 9, wherein the specific operating parameter range is an operating temperature range and the first and second sets of parameter data include an operating temperature of the optoelectronic device.

15. The optoelectronic device as defined in claim 9, wherein the microcode, when executed by the processor, further causes the optoelectronic device to perform the following:
    automatically shutting down the optoelectronic device upon reaching the estimated end of life if an automatic shutdown feature of the optoelectronic device has been enabled.

* * * * *